Patented Jan. 12, 1932

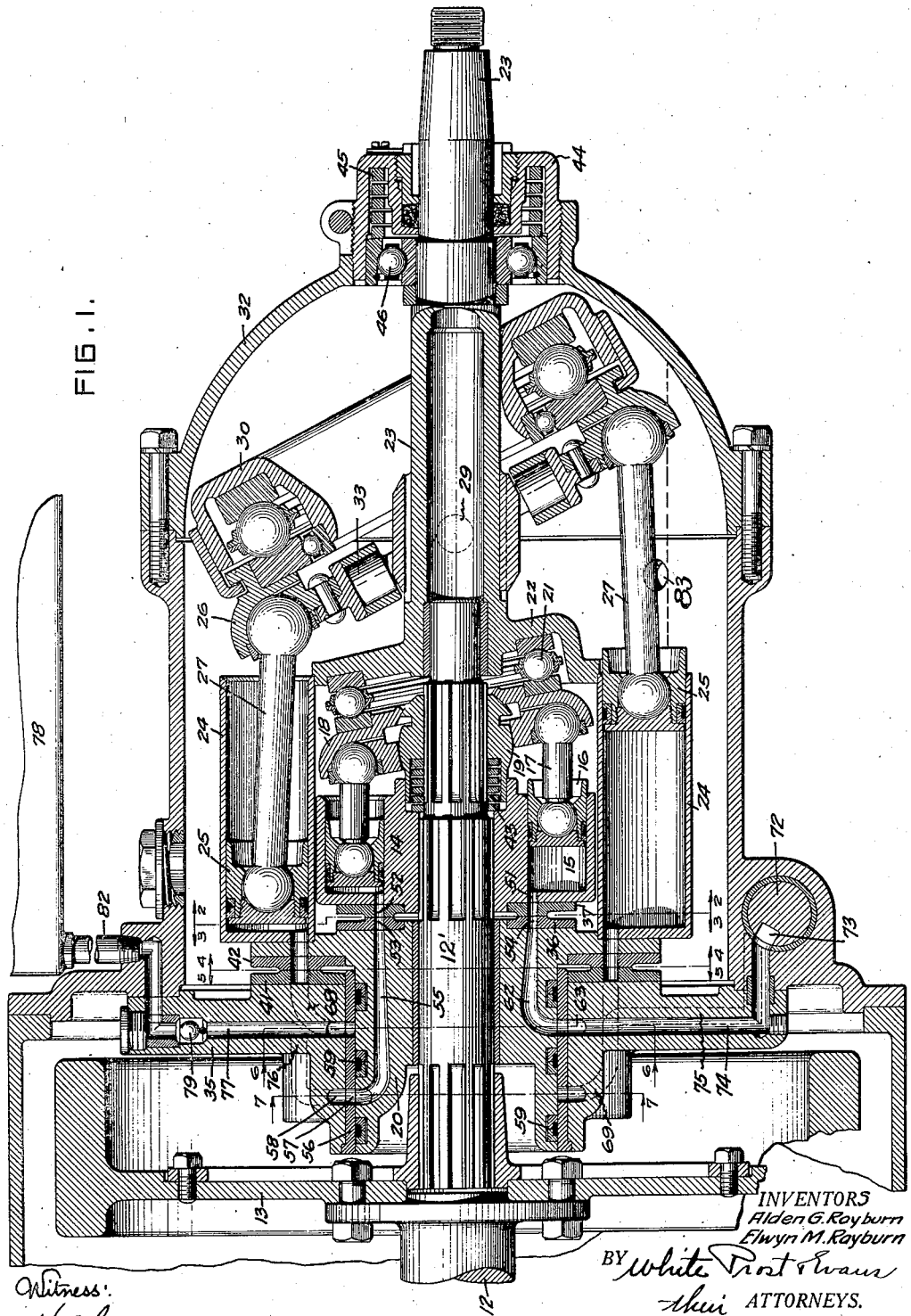

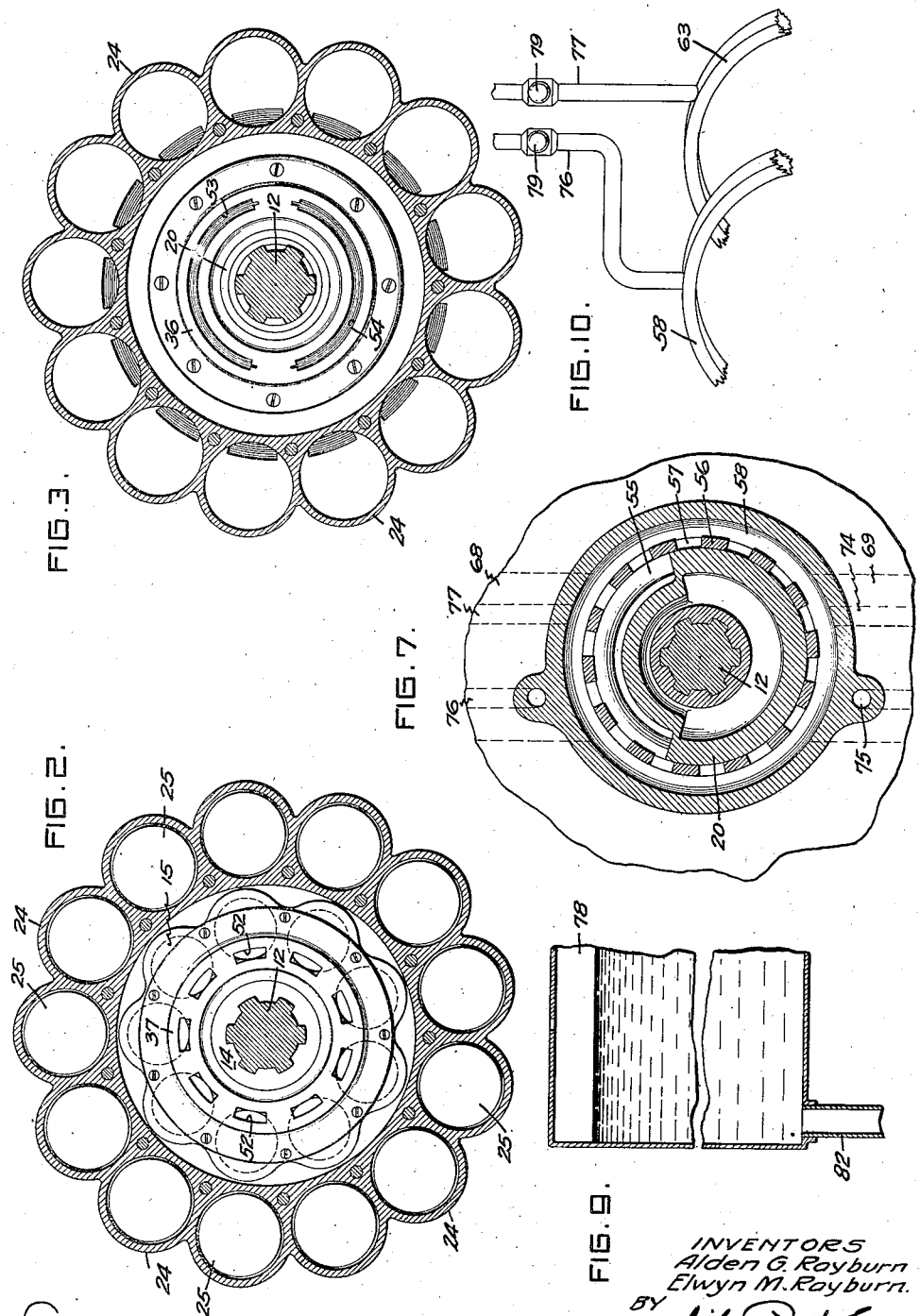

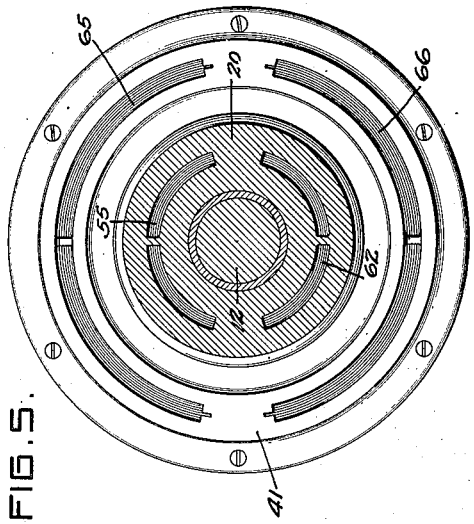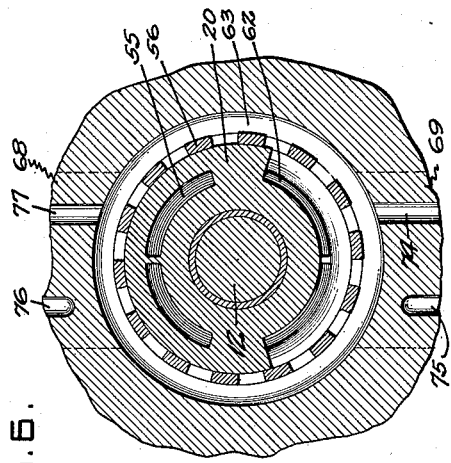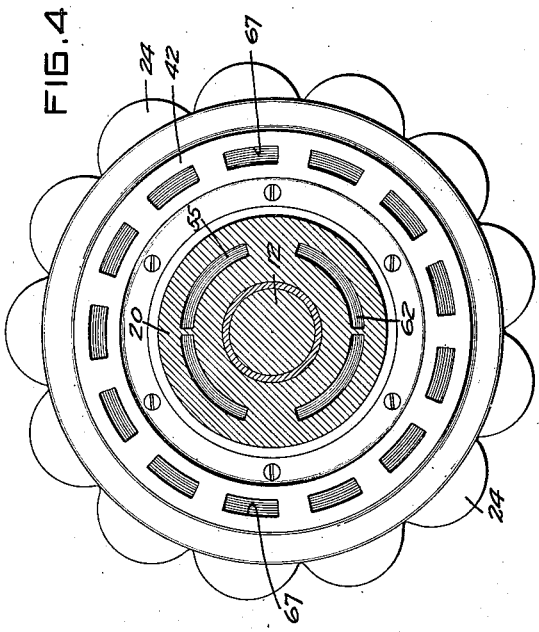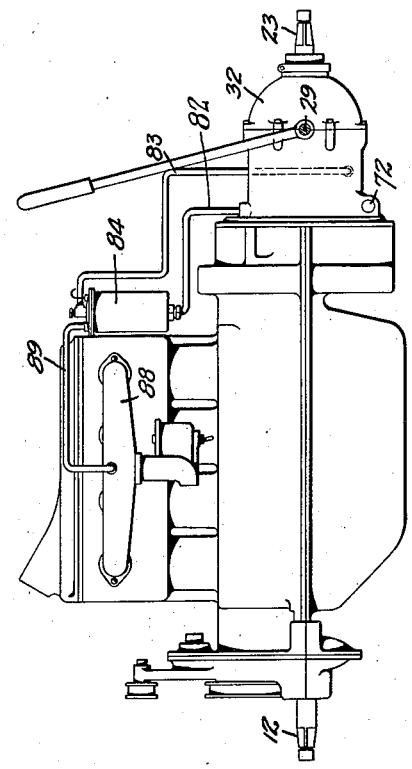

1,840,865

UNITED STATES PATENT OFFICE

ALDEN G. RAYBURN AND ELWYN M. RAYBURN, OF SAUSALITO, CALIFORNIA, ASSIGNORS, BY MESNE ASSIGNMENTS, TO AUTOMOTIVE ENGINEERING CORPORATION, A CORPORATION OF DELAWARE

HYDRAULIC TRANSMISSION APPARATUS

Application filed November 1, 1923, Serial No. 672,032. Renewed January 7, 1930.

The invention relates to a closed system hydraulic displacement apparatus in which the liquid is contained in a closed system and is moved back and forth between the various instrumentalities forming the operative structure of the apparatus.

An object of the invention is to provide means for preventing the entry of air into the closed system.

Another object of the invention is to provide means for removing any air which might have been initially trapped in the closed system.

Another object of the invention is to provide means for supplying liquid to replace the liquid which leaks from the closed system.

Another object of the invention is to recover the liquid which leaks from the closed system and return it to the system to take the place of liquid subsequently leaking therefrom.

Another object of the invention is to provide a hydraulic transmission apparatus from the working parts of which, air is excluded, and to produce a highly efficient mechanism for the transmission of power at various speed reductions.

The invention possesses other advantageous features, some of which with the foregoing, will be set forth at length in the following description, where we shall outline in full, that form of our invention which we have selected for illustration in the drawings accompanying and forming part of the present specification. In said drawings we have shown one form of apparatus embodying our invention, but it is to be understood that we do not limit ourselves to such form, since the invention, as set forth in the claims, may be embodied in a plurality of forms.

In the drawings we have shown the invention embodied in a hydraulic transmission apparatus for transmitting power at various speed ratios, but it is to be understood that the invention is equally applicable to any closed system hydraulic displacement apparatus, which, in its operation, has pressures produced therein, which are lower than atmospheric pressure, whereby air may be drawn into the closed system through joints therein.

Referring to said drawings:

Figure 1 is a longitudinal section through a power transmission apparatus embodying our invention.

Figure 2 is a cross section taken on the line 2—2 Figure 1, looking in the direction of the arrows.

Figure 3 is a cross section taken on the line 3—3 Figure 1 looking in the direction of the arrows.

Figure 4 is a cross section taken on the line 4—4 Figure 1, looking in the direction of the arrows.

Figure 5 is a cross section taken on the line 5—5 Figure 1, looking in the direction of the arrows.

Figure 6 is a cross section taken on the line 6—6 Figure 1, looking in the direction of the arrows.

Figure 7 is a cross section taken on the line 7—7 Figure 1, looking in the direction of the arrows.

Figure 8 is a side elevation of a hydraulic power transmission apparatus associated with an internal combustion engine, showing the features of our invention.

Figure 9 is a fragmentary section of the replacement liquid supply tank, showing the means provided for permitting the ready escape of air from the system.

Figure 10 is a diagrammatic representation of the liquid chambers in the apparatus, showing the air vent conduit and the replacement liquid conduit.

This invention relates to hydraulic displacement apparatus of the closed system type, in which liquid, usually oil, is circulated in a closed system between two operative instrumentalities which are relatively movable. Due to the relative movement of the instrumentalities, it is necessary to provide joints between the moving surfaces and, due to the pressures developed within the apparatus during its operation, it is practically impossible to prevent leakage at these joints. The pressures within the closed system vary from a high pressure, to a low pressure, which is usually below atmospheric pressure, and these pressures are effective at the joints, causing a leakage of oil from the closed system and the introduction of air into the closed system. Since the apparatus is designed to operate with liquid which is practically incompressible, the introduction of a compressible gas, such as air, into the system, renders it inefficient and inoperative. It has been found impracticable to prevent leakage at the joints and in order to overcome the difficulties due to leakage, we have provided means for supplying oil to the closed system to replace the oil which is lost therefrom by leakage. This oil is preferably supplied at a pressure in excess of atmospheric pressure, so that the low pressures, that is pressures below atmosphere, which would otherwise exist in the apparatus, are eliminated. This operates to prevent the entry of air into the closed system at the joints and to further insure the prevention of the entry of air into the system we surround the apparatus with air under a pressure lower than atmospheric pressure, thus increasing the differential between the low pressure within the apparatus and the external pressure, so that the entry of air into the closed system through the joints is entirely prevented. We prefer to surround the operating apparatus with a closed casing and to produce a condition of vacuum within said casing thereby not only reducing the external pressure at the joint but also reducing the air resistance to the rotating parts. The conduit, through which air is exhausted from the casing, is preferably connected to the casing adjacent the bottom thereof so that the oil leaking from the closed system is withdrawn from the casing through this conduit, thereby preventing the accumulation of oil in the casing, with its resultant retarding action upon the rotating apparatus. The oil withdrawn from the casing is preferably introduced into a supply tank arranged above the casing, from which it flows into the closed system, to replace the oil lost therefrom by leakage. The vacuum may be derived from any suitable source and, when the apparatus comprises a power transmission mechanism used in connection with an internal combustion engine, the vacuum may be derived from the inlet manifold of the engine. The inlet manifold is connected in the usual manner to a vacuum tank, such as is now used generally on automobiles to cause a flow of gasoline from the supply tank to the vacuum tank which is arranged adjacent to and above the engine. The vacuum produced in this tank causes the flow of the excess oil from the casing into the vacuum tank, from which it flows by gravity back into the closed system. In this way the oil is conserved, and the casing is maintained in a condition of vacuum, thereby not only producing the desirable results heretofore enumerated, but also preventing leakage of oil from the casing.

In the drawings we have shown the invention as applied to a hydraulic power transmission apparatus. This apparatus comprises a drive-shaft section 12, having secured thereto a fly-wheel 13 having an axial drive-shaft extension 12' upon which is mounted a pump unit 14. The pump unit comprises a cylinder block having a plurality of cylinders 15 therein and having a piston 16 in each cylinder. The pistons 16 are connected by the piston rods 17 to the wobble plate 18 which is arranged to rotate with the drive shaft. The plate seats upon the curved outer surfaces of a coupling member 19 secured to the drive-shaft. This type of coupling permits the plate to have a limited universal movement with respect to the shaft which drives it. The wobble plate 18 is inclined to the axis of the drive-shaft 12 and is provided with a similarly inclined thrust-bearing 21 which is supported on the similarly inclined flange 22 formed on the end on the driven shaft 23. The driven element comprises the flange 22, the plurality of cylinders 24 carried thereby and the block 20 journalled on the drive-shaft 12. These elements are rigidly secured together so that they rotate as a unit. Disposed in each cylinder 24 is a piston 25 and the pistons are connected to the wobble plate 26 by the piston-rods 27. The wobble plate 26 is supported in a housing 30, the inclination of which may be varied, to vary the stroke of the pistons 25. The housing 30 is mounted on diametrically opposed trunnions 29 which are journalled in the casing 32 and one of the trunnions is preferably provided with an operating lever whereby the inclination of the housing may be varied. The wobble plate 26 is connected to the driven shaft 23 by a gimbal joint 33 so that rotation of the wobble plate is transferred to the driven shaft.

The relative speeds of rotation of the cylinder block comprising the cylinders 15 and the cylinder block comprising the cylinders 24 depends upon the angularity of the housing 30. Rotation of the drive shaft 12 causes rotation of the cylinder block 14 and due to the angularity of the wobble plate 18 causes reciprocation of the pistons 16 in the cylinders 15. The cylinders 15 are arranged in a circle concentric with the axis of the drive-shaft 12 so that as the pistons 16 reciprocate, oil is forced from some of the cylinders and is drawn into other of the cylinders. Conduits and valves are provided for conducting the oil forced from the cylinders 15 to certain of the cylinders 24 and to cause other of the cylinders 15 to draw oil from other of the cylinders 24. There is thus produced in the apparatus at all times during its operation, zones of high pressure in the conduit through which oil discharges from certain of the cylinders 15 and zones of low pressure in the conduit through which oil is flowing into certain of the cylinders 15. Since the two cylinder blocks rotate at different speeds joints must be provided between the two blocks and the conduits extend past these joints, so that there is produced at the joints, during the operation of the machine, zones of high pressure and low pressure. The high pressure tends to cause leakage of the oil at the joints and the low pressure, which is frequently below atmospheric pressure, tends to cause the introduction of air into the closed system through the joints. One joint occurs between the cylinder block 14 and the block 20 which forms part of the driven unit and another joint occurs between the block 20 and the stationary head-plate 35 through which the conduits extend. The joint between the cylinder block 14 and the block 20 is formed by the two contact plates 36 and 37 which have flat surfaces in frictional contact and which are provided with apertures which serve as valves to control the flow of the oil. The joint between the block 20 and the head-plate 35 is formed by the plates 41 and 42 which are similarly constructed. The plates 36 and 37 are normally held in tight contact by the spring 43 which is interposed between the bearing member 19 and the cylinder block 14 which is slidable on the drive shaft 12. The joint between the plates 41 and 42 is kept tight by the spring 45 which is interposed between a bearing cage 44 and the bearing 46 of the driven-shaft 23. This spring 45 operates to push the entire driven element forward, pressing the plate 42 against the plate 41. These springs operate to hold the contact surfaces in tight engagement when the apparatus is at rest. When the apparatus is in operation, pressures are developed which hold the contact surfaces in tighter contact, but even this condition does not prevent the leakage of air and oil past the contact surfaces. The bearing cage 44, as shown, is threaded into the casing 32 and the bearing 46 abuts a portion of shaft 23, from which it results that the cage may be adjustably rotated to move shaft 23 longitudinally and hence to secure any desired degree of running clearance between the valves and the surfaces which they engage.

The ports 51 of the cylinders 15 are formed at the inner sides of the cylinders, that is at the sides closest to the axis of the drive shaft 12, so that when the cylinder block 14 is rotating, any air contained within the cylinders 15 is forced toward the inner sides thereof due to the action of centrifugal force on the oil and this air finds its way out of the cylinders through the ports 51. The plate 37, which is fixed to the cylinder block 14 is provided with apertures 52 which register with the ports 51 in the cylinders. These apertures 52 are arranged in a circle concentric with the axis of rotation of the drive shaft 12 and in combination with apertures in the plate 36, operate as valves to accomplish the proper distribution of the oil. The plate 36 is fixed to the block 20 which rotates with respect to the cylinder block 14 and the plate 36 is provided with two substantially semi-circular apertures 53 and 54 which register with the apertures 52. The apertures 53 and 54 are spaced apart at their ends, forming bridges which are of sufficient width to cover one of the ports 52. Formed in the block 20 and communicating with the aperture 53 is a passage 55 which is substantially semi-circular in cross section and which opens on the cylindrical face of the block 20. The block 20 is journalled in the head plate 35 and interposed between the block and the head plate is a bearing sleeve 56 which is provided with apertures 57 to permit the oil to flow into the annular chamber 58 formed in the head 35. Leakage of oil between the bearing sleeve 56 and the block 20 is prevented by a plurality of seal rings 59. The aperture 54 in the plate 36 communicates with a similarly shaped passage 62 formed in the block 20 and this passage opens onto the face of the block 20 in a plane which is spaced from the plane of the chamber 58. The bearing sleeve 56 is provided with another set of apertures, these apertures opening into an annular chamber 63 formed in the head plate 35.

The annular chambers 58 and 63 therefore are in communication with the cylinders 15, one chamber being in communication with one group of these cylinders and the other chamber being in communication with the other group of these cylinders, so that during the operation of the machine oil is flowing from the cylinders into one chamber and is flowing from the other chamber into other of the cylinders. The chambers 58 and 63 are also connected to the cylinders 24 so that a closed circuit is established between the cylinders 24 and the cylinders 15, whereby the oil may circulate back and forth between the two series of cylinders. During the operation of the apparatus, high pressure is produced in one of the chambers 58 or 63 and low pressure is produced in the other chamber, the particular chamber in which the high presure is produced depending upon the setting of the valves. When the device is operated in the reverse direction, the pressures in the two chambers are reversed. The contact plate 41 is provided with two substantially semi-circular apertures or ports 65 and 66 which register with the ports 67 formed in the plate 42. The plate 42 is secured to the block 20 and each port 67 registers with the port of its associated cylinder 24. The ports 65 and 66 in combination with the ports 67, serve as valves to control the flow of oil to and from the cylinders 24. The aperture 65 in the plate 41 is connected to the chamber 63 by the conduit 68 and the aperture 66 in the plate 41, is connected to the chamber 58 by the conduit 69. Rotation of the cylinder block 14 therefore causes oil to be forced to certain selected cylinders 24 and movement of the pistons therein causes oil to be forced from certain of the other cylinders 24 to certain cylinders 15. The distribution of this oil between the various cylinders is controlled by the apertures in the plates 36, 37, 41 and 42, so that the oil is delivered to the proper cylinders to cause operation of the apparatus.

Means are provided for short-circuiting the flow of oil to instantly throw the apparatus out of operation when desired, this means serving the function of a clutch to disconnect the drive shaft from the driven shaft. This is accomplished by directly connecting together the chambers 58 and 63 so that the oil discharged from certain of the cylinders 15 is introduced into other of the cylinders 15 thus causing the apparatus to run idle. Rotatably mounted in the casing 32 is a plug valve assembly 72 having an elongated passage 73 therein which may be turned to directly connect the conduits 74 and 75 which open respectively into the chambers 63 and 58. In the drawings the valve 72 is shown turned to a position so that the slot 73 directly connects the two conduits 74 and 75, thus forming a bypass for the oil delivered by the cylinders 15. By rotating the valve 72 to bring the slot 73 out of registry with the ends of the conduits 74 and 75 the oil is forced to flow through the entire closed system of the apparatus.

Means are provided for introducing oil into the closed system to replace any oil which may be discharged therefrom due to leakage past the joints. This means also serves to convey from the closed system any air which might have been trapped therein when the system was intially charged with oil. Formed in the end plate and communicating with the chambers 58 and 63 therein are two upwardly extending conduits 76 and 77 which extend upward to a suitable supply of oil, such as might be contained in the tank 78. This tank is placed sufficiently high above the apparatus so that the replacement oil is introduced into the chambers 58 and 63 at a pressure in excess of atmospheric pressure. Since the pressures within the chambers 58 and 63 vary from high pressure to low pressure due to reversal of the apparatus, check valves 79 are arranged in the conduits 76 and 77 to prevent the upward flow of oil therethrough. When leakage from the apparatus occurs, however, oil flows downward through that conduit which communicates with the low pressure chamber to replace the leakage. When the apparatus is arranged so that it may not be reversed, only one oil supply conduit is necessary and this conduit is connected to the low pressure chamber and need not be provided with a check valve. Any air entrapped in the apparatus soon finds its way to the chambers 58 and 63 and rises to the upper part of these chambers, at which point the conduits 76 and 77 are connected and this air passes up through these conduits and leaks past the check valves 79 and is discharged into the tank 78.

Since the entry of air into the closed system, during the operation of the apparatus, is caused by an existence of a pressure within the apparatus which is lower than atmospheric pressure, the introduction of replacement oil into the low pressure zone of the system under pressure in excess of atmosphere prevents the formation of this pressure lower than atmosphere within the apparatus, thereby tending to prevent the entry of air into the system. We have found however, that the entry of air into the system may be absolutely prevented by reducing the pressure of the air surrounding the apparatus to below atmosphere. For this reason the case 32 is made airtight and means is provided for producing a condition of vacuum within the casing. By thus reducing the surrounding pressure, the differential of pressure between the low internal pressure and the external pressure is increased so that there is always a pressure within the apparatus in excess of the pressure surrounding the apparatus so that there is no tendency of air to enter the closed system. The vacuum may be produced within the casing 32 in any suitable manner but we prefer to use a vacuum tank 84, similar to those used on automobiles to cause the flow of gasoline from the supply tank. The vacuum tank is preferably connected to the casing 32 adjacent the bottom thereof so that not only it produces a vacuum within the casing but also serves to limit the level of the oil in the casing. The casing must contain sufficient oil to properly lubricate the parts of the apparatus and this is preferably done by the system, but an excess of oil in the casing acts as a brake to reduce the efficiency of the apparatus. Any excess oil which finds its way into the casing due to leakage from the closed system is removed through the conduit 83 which is connected to the casing adjacent the bottom thereof, and is accumulated in the vacuum tank 84. From this tank the oil flows through the pipes 82 to the conduits 76 and 77 in the head of the apparatus, to replace leakage. The vacuum may be derived from any suitable source and when the apparatus constitutes a power transmission apparatus for use in conjunction with an internal combustion engine the tank 84 may be connected to the inlet manifold 88 of the engine by a conduit 89.

By this arrangement, leakage from the closed system is not deleterious, since replacement oil is supplied under sufficient pressure to prevent the formation in the closed system of a pressure lower than the external pressure, thus preventing the entry of air into the closed system. The leakage oil is removed from the casing and accumulated in the vacuum tank, when it again flows into the closed system. This prevents the waste of oil, maintains the level of the oil in the casing at the proper height and insures a supply of oil to continuously replace leakage.

We claim:

1. The combination with an internal combustion engine having an inlet manifold, of a closed system hydraulic transmission apparatus driven by said engine, a closed casing enclosing said apparatus and a conduit connecting said manifold with the casing to produce a condition of vacuum within the casing.

2. The combination with an internal combustion engine having an inlet manifold, of a closed system hydraulic transmission apparatus driven by said engine, said apparatus having joints through which liquid and air may pass, a closed casing surrounding said apparatus, a vacuum tank, a conduit connecting said tank with the inlet manifold and a conduit connecting said tank with the casing adjacent the bottom thereof.

3. The combination with an internal combustion engine having an inlet manifold, of a closed system hydraulic transmission apparatus driven by said engine, said apparatus having joints through which liquid and air may pass, a closed casing surrounding said apparatus, a vacuum tank, a conduit connecting said tank with the inlet manifold, a conduit connecting said tank with the casing adjacent the bottom thereof whereby liquid is caused to flow from the casing into the tank and a conduit connecting the tank with the apparatus to conduct liquid to the apparatus to replace the liquid lost by leakage.

4. A fluid operated transmission of the type that includes a fluid pump of the differential type and a fluid motor, each comprising a plurality of pistons reciprocating in cylinders provided in cylinder blocks carried by the drive and driven shaft, respectively, including a stationary casing and cooperating fluid distributing plates arranged between the cylinder blocks and between one of said blocks and said casing, said plates being so arranged that the pressures generated in said pump and motor urge them into close contact with each other, and passages in said casing causing a circulation of the fluid between said pump and said motor.

5. In a fluid operated transmission system including rotatably mounted pump and motor cylinder blocks arranged to rotate in partial vacuum, means arranged to separate entrapped air from the fluid during the rotation of said blocks, and means to discharge said air from the system.

6. A fluid transmission including a casing, a fluid circulating system including differentially operating rotatable pump and motor elements disposed within said casing; means to distribute fluid between said motor and pump so arranged as to collect entrained air from the fluid discharged from the motor; means to discharge said collected air from the system; and means to withdraw fluid by suction from the interior of said casing and to return it by gravity to said fluid circulating system.

7. A hydraulic transmission comprising a driving member; a driven member; a pump actuated by said driving member; a motor driving said driven member operated by fluid delivered thereto by said pump; means through which fluid is circulated between said motor and said pump arranged to collect air entrained in the fluid circulating therethrough; means to discharge the collected air from the fluid circulating system while preventing the substantial discharge of fluid therefrom during the operation of said transmission under service conditions, and means to supply fluid through said last mentioned means to said circulating system.

8. A differential fluid transmission system, including relatively rotatable pump and motor elements having contacting portions, means to conduct the fluid through said portions, said portions being so arranged that the pressures generated in said pump and motor are effective to maintain said portions substantially in fluid tight contact, means to collect entrained air at predetermined points in the system and means to discharge said air at points outside the system.

9. A differential fluid transmission including relatively movable motor and pump elements, having contacting surfaces, means extending transversely to said surfaces to distribute the fluid between said elements, said motor and pump elements being arranged so that the pressures created therein serve to maintain said surfaces in substantially fluid tight contact, means to conduct the fluid between said elements, and means to constantly maintain a pressure of fluid supply on said last named means whereby the system is maintained full of fluid under service conditions.

10. The combination with a prime mover of a power transmission apparatus driven thereby; said apparatus comprising a casing adapted to receive leakage fluid; a pump and motor disposed in said casing to which driving energy is supplied by said prime mover;

fluid receiving and distributing means interposed between said pump and said motor, and means actuated by said prime mover to withdraw said leakage fluid from said casing and to return it to said fluid receiving means by gravity.

11. In combination with a prime mover a torque multiplying hydraulic transmission comprising driving means driven by said prime mover, driven means, a pump actuated by the relative rotation of said driving and said driven means comprising a plurality of rotatable recesses adapted to receive fluid and from which fluid is expelled in operation; a motor comprising a plurality of reciprocable members rotatable at speeds different from the speed of rotation of said pump recesses, driving said driven means; means for distributing fluid between said pump and motor comprising a stationary member having low and high pressure fluid spaces; a casing surrounding said pump and motor mechanism; and means operated by said prime mover to withdraw fluid from said casing and to return it by gravity to said low pressure space.

12. A hydraulic transmission comprising a driving member; a driven member; a pump actuated by the difference in rotation of said members; a motor actuated by fluid delivered thereto by said pump driving said driven member; rotatable fluid distributing means; stationary fluid receiving and distributing means having high and low pressure fluid spaces co-acting with said rotatable distributing means to distribute fluid between said pump and said motor, said low pressure space being arranged to permit separation of and to collect air entrained in the fluid; a fluid storage space disposed above the level of said low pressure space; and a feed passage between said fluid storage space and said low pressure space, arranged to permit the passage of said collected air from said low pressure space to said fluid storage space and to constantly maintain a fluid pressure supply in said low pressure space.

13. The combination as set forth in claim 12 together with means for checking loss of fluid from said low pressure space to said storage space due to the development of internal pressures under operating conditions.

14. The combination as set forth in claim 12, together with a casing surrounding said pump and motor; and means to withdraw fluid from said casing continuously and to return it to said low pressure space.

15. The combination as set forth in claim 12, together with a stationary case surrounding said pump and motor secured to said stationary distributing means; and means to withdraw leakage fluid from said casing by suction and to return it to said fluid storage space by gravity.

16. The combination as set forth in claim 12, together with motor by-pass means for interconnecting said high and low pressure spaces.

17. The combination as set forth in claim 12, together with a clutch valve in said stationary distributing means and fluid passages connecting said clutch valve with said low and high pressure spaces.

18. A torque multiplying hydraulic transmission comprising driving means, driven means, a pump actuated by the relative rotation of said driving and said driven means comprising a plurality of rotatable recesses adapted to receive fluid and from which fluid is expelled in operation; a motor comprising a plurality of reciprocable members rotatable at different speeds from the speed of rotation of said pump recesses and driving said driven means; means for distributing fluid between said pump and said motor comprising a low pressure fluid space and a high pressure fluid space, said low pressure fluid space being arranged to collect air entrained in said fluid; means for permitting the substantially free escape of said collected air from said low pressure space while preventing substantial loss of fluid upon development of fluid pressures therein in operation of the transmission, and means for supplying fluid through said last means to said low pressure fluid space.

19. A fluid transmission comprising a driving member, a driven member, a fluid pump operated by the difference in rotation of said driving and said driven members, a motor driving said driven member and actuated by fluid delivered thereto by said pump, stationary fluid receiving means having high and low pressure fluid spaces through which fluid is circulated by said pump and motor, said low pressure space being so arranged that entrained air will separate from the fluid therein, means for permitting said separated air to escape from said low pressure space, and means for constantly maintaining a pressure of fluid supply in said low pressure space whereby the system is maintained full of fluid under service conditions.

20. A torque multiplying transmission apparatus embodying a driving member; a driven member; a fluid pump comprising an element actuated by said driving member and a complemental element operatively connected to said driven member, the first said element being provided with a plurality of recesses for receiving fluid in operation of the apparatus, and the second said element provided with members fitting into and expelling fluid from said recesses in operation of the apparatus; a fluid motor comprising reciprocating elements driving said driven member; fluid distributing means interposed between said pump and motor; a fluid space in said fluid distributing means arranged to permit entrained air to rise upward from the fluid circulated therethrough by the operation of said pump and motor; and a fluid storage compartment disposed above and communicating with said passage.

21. The combination as set forth in claim 20, together with means to prevent substantial loss of fluid from the system to said storage compartment upon the development of internal pressures therein.

22. The combination as set forth in claim 20, in which said motor comprises a plurality of rotating cylinders and reciprocating pistons mounted in said cylinders.

23. The combination as set forth in claim 20, in which said motor is of variable volumetric capacity, together with means for varying said capacity.

24. In combination, a drive shaft section carrying a flywheel; a housing having an open end supported closely adjacent said flywheel; and a hydraulic transmission system arranged within said housing; said system comprising a driven shaft; an axial extension carried by said flywheel; a pump mounted at said open end of the casing and consisting of complemental units, one of which is mounted on said axial extension and adapted to rotate in unison therewith, and the other of which is carried by said driven shaft; a fluid motor driving said driven shaft; fluid ports for said pump; fluid ports for said motor; and means forming fluid paths between the sets of fluid ports, said means including a distributing valve extending across said fluid paths.

25. In the combination defined in claim 24, said valve being of the plate or disc type; and said means and said valve being disposed between the remainder of the transmission system and the flywheel.

26. In the combination defined in claim 24, said means also including a clutch valve interposed in one of said fluid passages at a point in a portion of said housing adjacent said open end of the housing.

27. A hydraulic transmission unit comprising a driving shaft; a driven shaft; a fluid pump consisting of complemental rotatable units mounted upon said driving and driven shafts respectively and actuated by relative rotation thereof; a longitudinally shiftable and substantially ball-shaped member carried by one of said shafts for rotation therewith, said member having curved outer surfaces for universally receiving a portion of one of said complemental units of the pump; a spring for maintaining said portion and said member in engagement; a fluid motor for actuating said driven shaft; and means for distributing operating fluid between said pump and said motor.

28. A hydraulic transmission unit comprising a housing; a driving member at the forward end of said housing; a driven shaft journaled for rotation in said housing and projecting through the rear end thereof; a fluid pump consisting of complemental rotatable units actuated by relative rotation of said driving member and said driven shaft; a fluid motor for driving said driven member; means for distributing operating fluid between said pump and said motor, said means including ported plates having their surfaces in engagement with a slight running clearance; and means for manually adjusting the degree of said clearance.

29. In the transmission unit defined in claim 28, said adjusting means comprising a longitudinally adjustable mechanism carried by said rear end of the housing and connected to said driven shaft to move the latter forwardly or rearwardly with respect to said housing to shift said motor respectively toward or from said ported plates.

30. In the transmission unit defined in claim 28, said adjusting means comprising a threaded cage carried at said rear end of the housing, a bearing within said cage and abutting a portion of said driven shaft, and including a spring within said cage thrusting said bearing against said abutting shaft portion to shift said driven shaft forwardly or rearwardly to decrease or increase respectively the degree of said clearance.

31. In a hydraulic transmission, driving means; driven means; a rotary pump comprising parts actuated by the difference in rotation of said driving and said driven means; said pump parts being relatively separably mounted; resilient means acting on said driven means to yieldingly hold said pump parts together; and a fluid motor, actuated by fluid delivered thereto by said pump, driving said driven means.

32. A hydraulic transmission comprising a fluid circulating system embodying a pump, a fluid motor, and interconnecting fluid passages between said pump and said motor; yielding means interconnecting said pump and motor, said means being operable to hold the same in fluid circulating relationship in power transmitting operations; encasing means adapted to receive fluid leakage from said system; a gravity storage tank for supplying fluid to said circulating system; and means for maintaining a constant level in said encasing means by removing any excess leakage fluid from said encasing means during operation of the transmission.

33. A hydraulic transmission comprising a driving shaft; a fluid pump actuated by said driving shaft; a fluid motor; connecting high and low pressure fluid conduits between said pump and motor; a shaft driven by said motor; a storage tank opened to atmosphere and designed to feed fluid to said pump, motor and conduits by gravity; a casing surrounding said pump and motor adapted to retain the fluid leakage from said pump and motor; and means to return the excess leakage from said casing to said storage tank substantially at atmospheric pressure.

34. A hydraulic transmission comprising a fluid circulating system embodying a pump, a fluid motor, and interconnecting fluid passages between said pump and said motor; a casing surrounding said circulating system adapted to retain the fluid leakage from said system; a gravity feed storage tank for supplying fluid to said circulating system; and means for removing leakage fluid from said casing and discharging it into said storage tank.

In testimony whereof, we have hereunto set our hands.

ALDEN G. RAYBURN.
ELWYN M. RAYBURN.